(12) United States Patent
Fischer et al.

(10) Patent No.: US 6,690,271 B2
(45) Date of Patent: Feb. 10, 2004

(54) DEVICE FOR MONITORING AT LEAST ONE PARAMETER FOR A PLURALITY OF VEHICLE WHEELS

(75) Inventors: Martin Fischer, Regensburg (DE); Dominik Füssel, Dietzenbach (DE); Martin Prenninger, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/205,308

(22) Filed: Jul. 24, 2002

(65) Prior Publication Data

US 2003/0020604 A1 Jan. 30, 2003

(30) Foreign Application Priority Data

Jul. 24, 2001 (DE) .......................................... 101 35 936

(51) Int. Cl.$^7$ .............................................. B60C 23/00
(52) U.S. Cl. ...................... 340/447; 340/442; 340/444; 340/445; 340/446; 73/146.2; 73/146.8
(58) Field of Search ................................ 340/445, 444, 340/442, 446, 447, 426.33; 73/146.2, 146.8

(56) References Cited

U.S. PATENT DOCUMENTS 5,808,190 A * 9/1998 Ernst .......................... 73/146.5

6,435,020 B1 * 8/2002 Oldenettel et al. .......... 340/445

FOREIGN PATENT DOCUMENTS

| DE | 199 21 413 C1 | 11/2000 |
| EP | 0 806 306 A2 | 11/1997 |
| EP | 0 931 679 A1 | 7/1999 |

* cited by examiner

*Primary Examiner*—Jeffery Hofsass
*Assistant Examiner*—Daniel Previl
(74) *Attorney, Agent, or Firm*—Laurence A. Greenberg; Werner H. Stemer; Ralph E. Locher

(57) ABSTRACT

A device for monitoring at least one parameter for vehicle wheels includes, on each wheel, a detector unit having a transmitter unit that respectively transmits a phase-modulated or frequency-modulated signal to a central evaluation and control unit. Each detector unit transmits, at specific time intervals, a brief signal that contains a uniquely defined identifier. After a wheel is changed, a renewed assignment of the detector unit to the respective wheel positions can be carried out in an assignment mode of the detector unit and of the control unit, by registering a profile of the mean reception power for each detector unit as a function of the angular position of the respective wheel and comparing such signature profile with stored signature information. The comparison can be carried out by cross-correlating the two respectively decisive curves, or by comparing individual values or specific characteristic variables of the profiles.

20 Claims, 3 Drawing Sheets

DEVICE FOR MONITORING AT LEAST ONE PARAMETER FOR A PLURALITY OF VEHICLE WHEELS

BACKGROUND OF THE INVENTION

Field of the Invention

The invention relates to a device for monitoring at least one parameter for a plurality of vehicle wheels.

The monitoring of parameters of a vehicle wheel, for example, of the tire pressure or the temperature of the tire, plays a decisive role for the safety of a vehicle or of the driver of a vehicle. To be able to dispense with manual checking of such parameters, devices have been developed with which it is possible to register important parameters of vehicle wheels automatically and display them, for example, by appropriate display devices on the dashboard. As it is generally desired not only to display the parameters but also to indicate a uniquely defined assignment between the displayed parameters and the position of the respective wheel, it is necessary to configure such a device to retain the assignment, or to re-initialize it, after a wheel is changed.

For such a purpose, existing in the prior art is an assignment of each detector device respectively disposed on a wheel to a receiver unit that is provided in the vicinity of the respective wheel position. As such, it is possible to detect the signal of the respectively adjacent detector device by reference to the intensity of the signals received through a receiver unit, by selecting the signal with the greatest intensity. It is assumed here that the detector devices of the wheels of a vehicle transmit with substantially the same transmitting power so that the signal of the respectively directly adjacent wheel or of the adjacent detector device has the greatest signal intensity at the reception location.

However, a disadvantage with such a device is that a receiver device is necessary for each wheel, the received signal of such a receiver device then having to be conducted in line-bound fashion to a central evaluation and control unit or directly to a display unit.

European Patent Application EP 0 806 306 A, corresponding to U.S. Pat. No. 5,808,190 to Ernst, discloses an air-pressure monitoring system in which the assignment of the wheel positions to the air-pressure monitoring devices that are disposed on the wheels is made possible by the fact that a further parameter is registered for each wheel with the air-pressure monitoring devices and with, in each case, a further measuring device assigned to the wheels. The parameter may be, for example, the rotational speed of the wheel. The air-pressure monitoring devices, thus, transmit not only measured values for the air pressure but also measured values for the further parameter to a central unit. As measured values are also transmitted from the further measuring devices to the central unit for the same further parameter, the central unit can make an assignment of an air-pressure monitoring device to a wheel position by comparing the measured values for the further parameter, if the measured value supplied by the respective air-pressure monitoring device for the further parameter coincides sufficiently precisely with the respective measured value of the parameter of a further measuring device. This is because the further measuring devices are disposed fixedly on the vehicle (not on the wheel), and, thus, remain continuously assigned to a specific wheel position.

A disadvantage with such a device is the additional expenditure on the two sensors for registering the further parameter. Even if the further parameter can be registered with the sensor that is provided in any case on the wheel for registering the air pressure, a further sensor that is provided fixedly on the vehicle is necessary for each wheel in order to register the further parameter.

Finally, European Patent Application EP 0 931 679 A discloses a method for assigning the wheel position of a motor vehicle in which the transmission signals of transmitter units assigned to the wheels are transmitted to a central receiver and evaluation unit, and in which the different characteristic influences of the individual transmission paths on the respective reception signal as the wheels rotate are widened in order to assign the signals to the wheel positions. For such a purpose, the envelope curve of the reception signal that is amplitude-modulated by the time variants including changes in the transmission properties is compared with stored signatures. However, the relatively complex registration and evaluation of the envelope curve is a disadvantage here.

SUMMARY OF THE INVENTION

It is accordingly an object of the invention to provide a device for monitoring at least one parameter for a plurality of vehicle wheels that overcomes the hereinafore-mentioned disadvantages of the heretofore-known devices of this general type and that makes it easily possible to assign the detector units disposed on the wheels to the wheel positions with the necessary reliability and, at the same time, to achieve the lowest possible expenditure on hardware.

With the foregoing and other objects in view, there is provided, in accordance with the invention, a device for monitoring vehicle wheels, including detector units disposed at the wheels, each detector unit having a sensor for registering at least one parameter of a wheel and a transmitter unit transmitting information regarding the at least one parameter, each of the detector units transmitting, with the transmitter unit, the information in a modulated signal over a wireless transmission path, a central evaluation and control unit having a receiver unit receiving the information from the transmitter unit and demodulating the signal, the control unit evaluating the information from the detector units, and generating signals dependent thereon, the control unit having a normal operating mode and an assignment mode and, in the normal operating mode each detector unit transmitting, as the information, an information item relating to the registered parameter and a wheel identifier uniquely defined for each of the wheels and the control unit evaluating the wheel identifier and the information relating to the registered parameter from the signal demodulated by the receiver unit and assigning a wheel position to each information item relating to the registered parameter from the identifier and from a stored assignment information item, in the assignment mode each the transmitter unit transmitting, as the information, at least the wheel identifier, the receiver unit generating a signature signal representing a measure for an average signal power of the received modulated signal, a duration of the signal transmitted by the transmitter unit of the detector units being shorter in comparison with a time required for a complete revolution of a wheel at a maximum speed of the wheel, the control unit registering the signature signal derived from each received signal and assigning an angle information item to the respective value of the signature signal, the control unit acquiring the angle information item from one of a time interval between one of the signature signals and the signature signals and a fixed time, and the group consisting of a velocity of the vehicle, a parameter proportional to the velocity of the vehicle, and an angle information item relating to an angular position of the respective wheel fed to the control unit, and the control unit assigning to the wheel position the wheel identifier transmitted by each of the detector units by comparing one of registered values and an information item determined therefrom with a stored signature information characteristic of each the wheel position, and storing the angle information item as an assignment information item.

The invention is based on the recognition that when data is transmitted by a preferably phase-modulated or frequency-modulated signal, the signal power occurring at the reception location of a central evaluation and control unit is influenced by the properties of the transmission path between the detector unit disposed on a wheel and the evaluation and control unit. The properties of the transmission path are determined here, on one hand, by the angular position of the wheel, and, thus, the position of the detector unit, and, on the other hand, by the parts or regions of the vehicle that influence the signal transmitted from the respective angular position. It has been found in practice that as the wheels rotate, the transmission paths at the various wheel positions are respectively different and at the same time characteristic of the wheel positions.

According to the invention, the mean signal power of the received signal is, therefore, evaluated by the evaluation and control unit to permit a detector unit to be assigned to a wheel position. For such a purpose, in an assignment mode, the evaluation and control unit compares values of the signature signal that are registered at various angular positions of the respective wheel, or an information item derived therefrom, with a stored signature information item that is characteristic for each wheel position.

The device according to the invention, therefore, permits the necessary assignment of the detector devices to the wheel positions, exclusively by a specific evaluation of a phase-modulated or frequency-modulated signal that is present in any case.

It is to be noted here that, during the determination of the mean signal power, the carrier frequency of the modulated signal is filtered such that the mean value that is determined can still follow the (relatively slow) change due to the revolution of the wheel.

Signature information is understood here to be any information, even any specific way of representing the registered values of the signature signal.

According to the invention, the duration of the signal transmitted by a transmitter unit is short in comparison with the time required for a complete revolution of a wheel at a maximum permitted or maximum possible speed. The evaluation and control unit assigns an angular information item to the discrete signature signal values that are generated thereby. The discrete values of the signature signal for different angular positions of the respective wheel are, thus, generated by the respectively chronologically shorter transmitted signals.

The assignment of the angular information can be carried out by supplying the evaluation and control unit with the signal of an angular sensor that registers the rotation of the respective wheel.

Instead of one angular sensor per wheel, it is also possible to provide merely a single angular sensor that registers the rotation of a wheel, its signal being used as an angle signal for all the wheels. This simplification will be permissible in most cases as the angular positions of the individual wheels (apart from deviations due to slip or slightly different rotational speeds when cornering) are largely identical.

In these embodiments, the evaluation and control unit can, if appropriate, also receive information about the absolute angular position of the respective wheel. However, this is not absolutely necessary for most embodiments of the invention that are explained below.

All that is necessary is for the evaluation and control unit to know the angular spacing between two received signals. One embodiment of the angular sensors as an incremental signal transmitter is sufficient in this case.

The evaluation and control unit can also acquire the angle information from the time interval between the signature signals or the time interval between the signature signals and a fixed time and from the velocity of the vehicle or a parameter that is proportional thereto. For example, the detector devices could transmit signals at equidistant time intervals in the assignment mode, and a signal that is a measure of the velocity of the vehicle or the rotational speed of the wheels could be fed to the evaluation and control unit. It is then possible to determine the angular spacing from the velocity of the vehicle or the rotational speed of the wheels, using the time interval between two signals.

When the angle information is assigned, it is, in principle, not necessary for one angle value to be assigned explicitly to one value of the signature signal. Instead, the process can also be carried out in that, for example, an angle value or a range of angle values is represented by a specific storage location or storage address.

In accordance with another feature of the invention, the stored signature information item is a characteristic profile that is formed from values of the signature signal acquired in a predetermined fashion in a reference mode at a plurality of angular positions, a first partial information item being made dependent on a second partial information item. Instead of such a profile, the stored signature information can also merely include one or more characteristic variables of such a profile.

The evaluation and control unit can, of course, also replace the discrete profile with a single function or in certain sections by a plurality of analytical functions.

For example, the stored signature information can be a characteristic (discrete or continuous) profile of the signature signal as a function of the angular position or of a variable connected thereto, it being preferably possible for the angular range to be one revolution of a wheel.

The stored signature information can also be present as histogram-like information, the value range for the signature signal being divided into sections of preferably equal width, and, in each case, the registered signature signals that occur in such a section being stored. The evaluation and control unit must then have the information indicating how the stored values have been registered with respect to their angular spacing and must perform the registration of the signature signal values in the same way, so as to permit comparability of the registered information and of the stored information.

The evaluation and control unit can also determine one or more characteristic variables of a profile that is formed from a plurality of signature signal values that are registered at specific angular positions of the respective wheel, and compare them corresponding stored characteristics variables or with characteristic variables determined from corresponding stored profiles. Such characteristic variables may be the mean value, the standard deviation or the maximum difference between the registered signature signal values or the stored profile of the signature information.

In accordance with a further feature of the invention, the stored signature information is a characteristic profile of the signature signal as a function of one of an angular position and a variable connected thereto.

In accordance with an added feature of the invention, the control unit determines at least one characteristic variable of a profile formed from a plurality of signature signal values registered at specific angular positions of a respective one of the wheels and compares the at least one characteristic variable with one of corresponding stored characteristic variables and characteristic variables determined from corresponding stored profiles.

In accordance with an additional feature of the invention, the evaluation and control unit can carry out a cross-correlation of the determined profile of the signature signal with the stored signature profiles and exclude those wheel positions that are assigned to those signature profiles at which the correlation coefficient is smaller than a predefined limit or assign those wheel positions that are assigned to those signature profiles at which the correlation coefficient is greater than a predefined limit.

In accordance with yet another feature of the invention, the evaluation and control unit compares a value pair composed of a signature signal and the associated angular position with all the stored signature profiles, and excludes from the assignment those wheel positions that are assigned to those signature profiles at which the comparison of the signature signal with the value of the signature profile at the respective angular position results in a deviation that is greater than a predefined limit. Of course, the evaluation and control unit can also make, as a function of the comparison, an assignment of those wheel positions at which the comparison of the signature signal with the value of the signature profile at the respective angular position results in a deviation that is smaller than a predefined limit.

The evaluation and control-unit preferably compares as many value pairs of one and the same detector device, or of different detector devices, with stored signature profiles as are necessary for a uniquely defined assignment to a wheel position to be obtained for all the detector devices.

However, for such a purpose, it is necessary for the evaluation and control unit to register or know the absolute angular positions of the wheels. In addition, the wheels must always be mounted in the same angular position on the hub, or the evaluation and control unit knows the possible angular differences between the possible mounting positions (as a rule dependent on the number of attachment screws distributed equidistantly over the circumference) and attempts to test all the possible positions by adding the possible difference angle.

In the preferred embodiment, the detector devices switch over into the assignment mode if no revolution of a wheel is detected for a time period that is longer than a predefined value. The predefined value for the time period can be selected, for example, to be approximately equal to the time that is necessary for a wheel change. The detection of whether or not a revolution of a wheel takes place can be carried out, for example, by an acceleration sensor that is included in the detector unit. In the assignment mode, the detector units transmit signals repeatedly and at different angular positions.

In accordance with yet a further feature of the invention, the control unit has a reference mode in which the control unit acquires the signature information by evaluating and storing the signals transmitted by the detector unit and the control unit is informed of an assignment of a signature profile to a respective the wheel position through one of externally supplied signals and externally supplied data inputs.

In accordance with a concomitant feature of the invention, the evaluation and control unit for determining the stored signature profiles or stored characteristic variables can be set to a reference mode. In such a mode, the evaluation and control unit picks up the signature profiles by evaluating and storing the signals transmitted by the detector units. Which signature signal is assigned to a particular wheel position is communicated to the control unit here manually or by external signals. The communication can be done, for example, by communicating the identifier of each of the detector units and the wheel position at which the respective detector unit is located to the control unit.

Other features that are considered as characteristic for the invention are set forth in the appended claims.

Although the invention is illustrated and described herein as embodied in a device for monitoring at least one parameter for a plurality of vehicle wheels, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
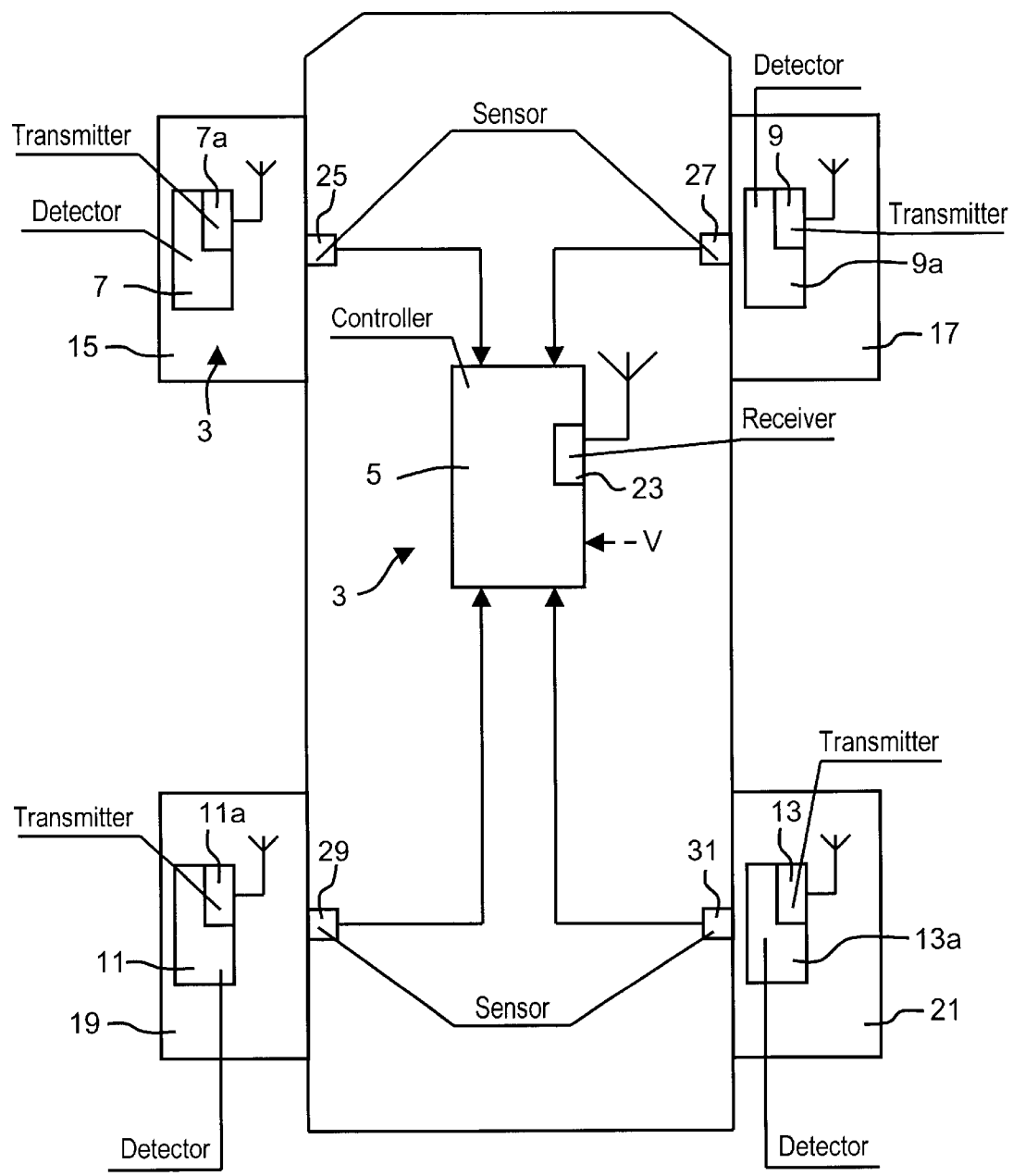
FIG. 1 is a diagrammatic plan view of a vehicle with a device for monitoring at least one parameter for a plurality of vehicle wheels according to the invention.

Referring now to the figures of the drawings in detail and first, particularly to FIG. 1 thereof, there is shown a vehicle 1 having a device 3 for monitoring at least one parameter for a plurality of wheels of the vehicle 1. The device 3 includes a central evaluation and control unit 5 and four detector units 7, 9, 11, 13. Each of the detector units 7, 9, 11, 13 is assigned to one of the wheels 15, 17, 19, 21 of the vehicle 1 and is disposed on the latter and can rotate with the wheel.

Each of the detector devices 7, 9, 11, 13 includes a transmitter unit 7a, 9a, 11a, 13a. Each of the transmitter units 7a, 9a, 11a, 13a transmits, at predetermined times, a brief frequency-modulated or phase-modulated signal that includes, as information, an identifier that is specific to each detector device 7, 9, 11, 13, and, if appropriate, a value for that parameter of the wheel that is to be monitored. However, the latter is not necessary in the assignment mode. The specific identifier and the value of the parameter are preferably implemented in the form of digital information or in the form of a digital signal that is used as the modulation signal for the carrier signal of the transmission signal.

The signals that are transmitted by the detector units 7, 9, 11, 13 and their transmitter units 7a, 9a, 11a, 13a are received by the evaluation and control unit 5 by a receiver unit 23 that is included therein. The receiver unit 23 demodulates the reception signal and, thus, permits the evaluation and control unit 5 to evaluate the preferably digital information signals, that is to say, the specific identifier and the value for the parameter to be monitored. The latter is, however, only absolutely necessary in the normal monitoring mode.

The evaluation and control unit 5 carries out collision monitoring, which prohibits evaluation in the event of a plurality of detector units 7, 9, 11, 13 transmitting simultaneously.

To avoid the expenditure on a bi-directional transmission of signals between the detector units and the evaluation and control unit, the detector units can be embodied such that they transmit their signals at random time intervals, in which case, of course, a specific value range may be provided for the time interval. Such a configuration avoids two detector units always transmitting simultaneously at the same times over a relatively long time period.

In the normal operating case, the evaluation and control unit 5 can make an assignment of the value for the parameter to be monitored to the wheel position solely based upon the specific identifier of a reception signal, as the assignment of each specific identifier to a wheel position has been made and stored in a previously executed assignment mode.

The assignment mode can, for example, be activated by the fact that each of the detector units 7, 9, 11, 13 includes a non-illustrated sensor that reacts to accelerations, the detector units switching into the assignment mode if no acceleration, and, thus, no revolution of a wheel, is detected for a specific time period. In the assignment mode, the signals are emitted at shorter intervals than is necessary during normal operation. This makes it possible to execute the assignment process more quickly. In the assignment mode, the signals do not necessarily also have to contain information relating to a value of the parameter to be monitored. Instead, in such a case, it is sufficient if the signal contains the specific identifier of the respective detector unit 7, 9, 11, 13.

At this point, it is to be noted that the duration of a signal both in during normal operation and in the assignment mode is short in comparison with the duration that a wheel requires for a complete revolution at a maximum permitted speed. The duration of a signal is typically approximately 1 millisecond to 100 milliseconds, for example, 10 milliseconds. The brief signal duration makes it possible to characterize the associated angular position of the respective wheel by the average signal power at the reception location of the evaluation and control unit 5 without an undesired integrating effect being produced by the rotation of the wheel.

In the assignment mode, the evaluation and control unit 5 registers the average signal power at the reception location, for which purpose the receiver unit 23 produces a signature signal that is a measure of the average signal power of the received phase-modulated or frequency-modulated signal. Furthermore, the evaluation and control unit 5 determines at least the relative angular position of the vehicle wheels.

A relative angular position can be determined, for example, by virtue of the fact that a signal (v) that constitutes a measure of the velocity of the vehicle or the rotational speed of the wheels is fed to the evaluation and control unit 5. Such a signal can be generated, for example, by the tachometer of the vehicle. Thus, a relative angular position, related to a randomly selected zero point, can be determined even when the velocity of the vehicle varies.

If a detector unit transmits a second signal at a specific time interval from a preceding signal, the evaluation and control unit 5 can determine a sufficiently precise absolute angular spacing between the two signals from the chronological difference, also registered by it, between the two signals and the velocity signal (v).

In the assignment mode, the evaluation and control unit 5 compares the information that is contained in one or more value pairs composed of the value of the received signature signal (value of the average reception power) and the angular position with the information that is contained in signature profiles, or corresponding characteristic variables, stored for each wheel position.

Figure 2:
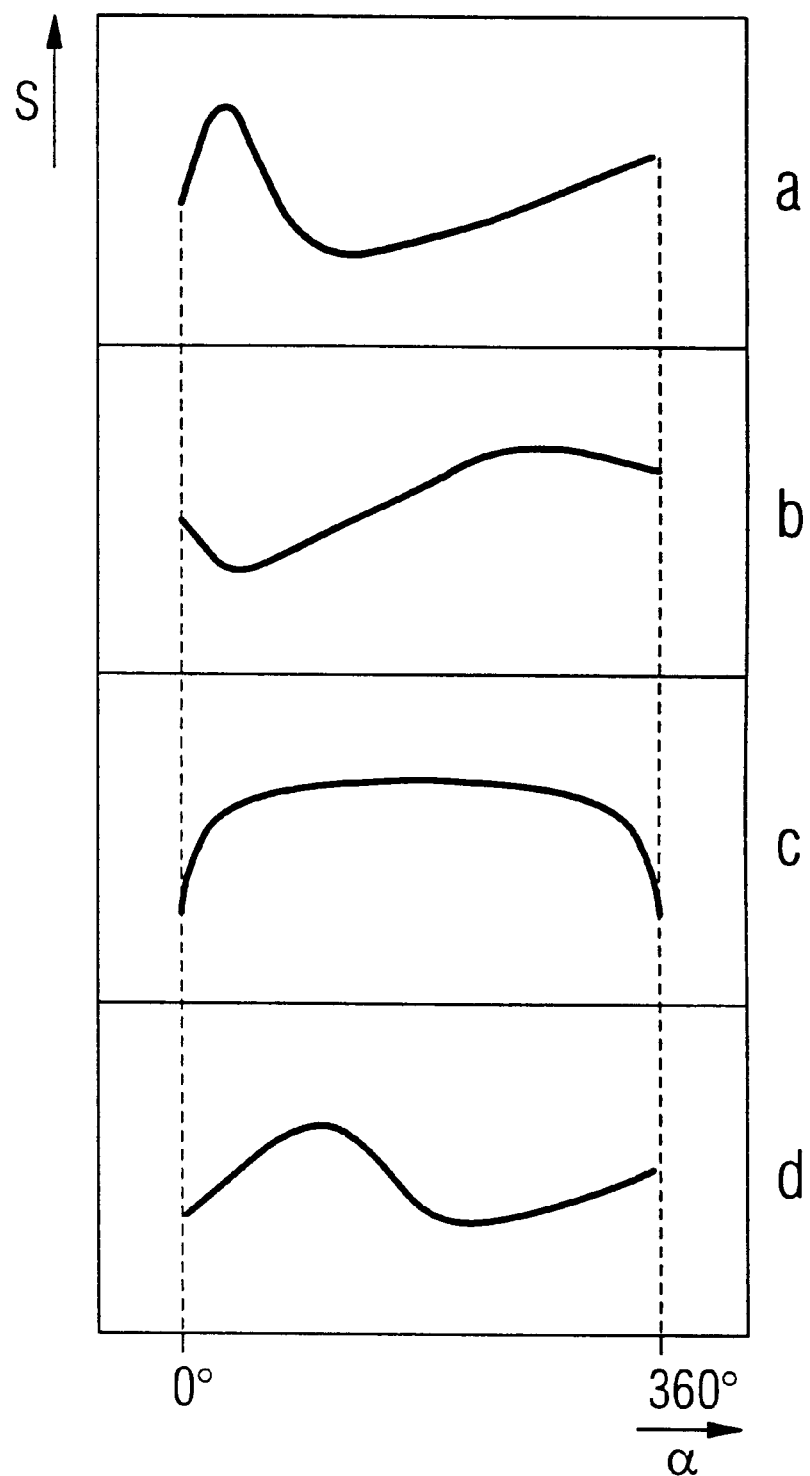
FIG. 2 is a set of graphs of exemplary stored signature profiles according to the invention.

FIG. 2 shows an example of four signature profiles that can be stored in the evaluation and control unit 5. In the example, the profile according to part a of FIG. 2 is assigned to the position of the left-hand front wheel 15, the profile according to part b of FIG. 2 is assigned to the position of the right-hand front wheel 17, the profile according to part c of FIG. 2 is assigned to the position of the left-hand rear wheel 19, and the profile according to part d of FIG. 2 is assigned to the position of the right-hand rear wheel 21. The signature profiles are stored here for one full revolution of the wheel.

In the simplest case, the evaluation and control unit 5 can, to assign the detector units 7, 9, 11, 13, register and test a value pair of a mean reception power and the associated angular position, which pair of the stored signature profiles has, at the respective angular value, a signature value that comes closest to the registered mean value. However, such a procedure requires knowledge of an absolute value. This can be registered, for example, for each wheel 15, 17, 19, 21 by a sensor 25, 27, 29, 31 of a non-illustrated anti-lock brake system that is present in any case, and fed to the evaluation and control unit 5. It is sufficient here if the signal of merely one of the sensors is fed to the evaluation and control unit as, as already mentioned, the angular positions of the wheels are largely identical. If an angle signal for each wheel is fed to the evaluation and control unit 5, the precise value that is associated with the respective angular position of the respective wheel can be obtained from the respectively stored signature profile and compared with the respectively registered value of the signature signal. Such a configuration results in improved precision of the assignment method.

The possibility described above of carrying out comparisons by individual value pairs is, however, of course subject to a greater degree of uncertainty.

It is more advantageous to use the possibilities illustrated in FIGS. 3a to 3d for assigning the detector units 7, 9, 11, 13 to the respective wheel positions.

Figure 3A:
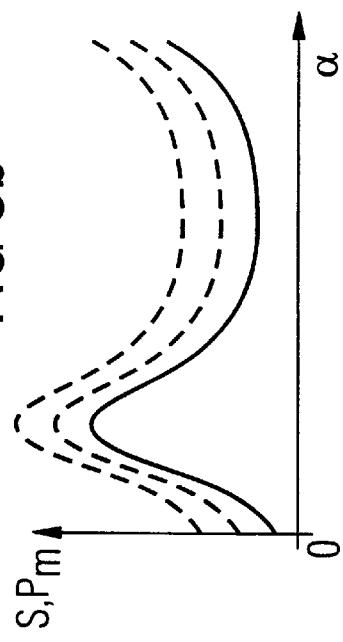
FIGS. 3a to 3d are graphs illustrating a stored signature profile of FIG. 2 and a plurality of profiles of the registered signature signal according to the invention.

FIG. 3a shows the stored signature profile $S(\alpha)$ according to part a of FIG. 2, as well as two possible profiles of registered signature signals that are each formed by a multiplicity of value pairs $P_m(\alpha_1)$. The registered profiles clearly originate here from the detector unit at that wheel position to which the stored profile $S(\alpha)$ is also assigned. The angular displacement can be obtained, for example, by virtue of the fact that a wheel was mounted at a different angular position with respect to the position of the detector unit than was the case when the stored profile was determined.

Corresponding angular displacements between the stored signature profile and the registered profile of the signature signal can result whenever only the relative angular position is registered.

If the comparison of the stored curve with a registered curve is carried out by cross-correlation of the two curves, such an angular displacement is irrelevant to the determination of the (maximum) correlation coefficient. The evaluation and control unit can determine the correlation coefficient and make an assignment of the registered curve to the wheel position of that stored signature profile if the value of the correlation coefficient exceeds a specific limit, or reject an assignment if this value drops below a specific limit.

Although the calculation of the correlation coefficient requires a certain degree of mathematical effort, such possibility constitutes a very fault-tolerant and reliable possible way of assigning the detector units to the wheel positions. To actually perform the assignment, the evaluation and control unit 5 can link the identifier of the respective detector unit to the respective wheel position and store such information.

Figure 3B:
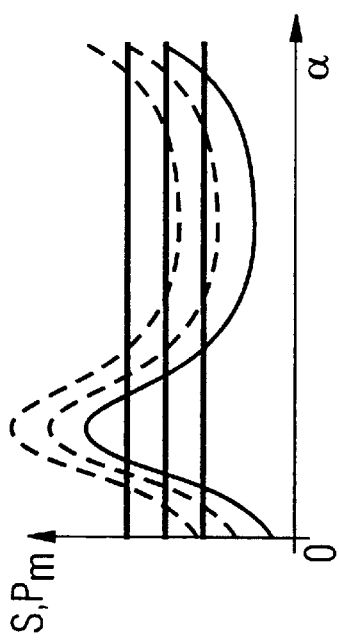

FIG. 3b shows, in turn, a diagram in which the angle-dependent signature profile according to part a of FIG. 2 is represented with an unbroken line. The profiles that are represented by dots are profiles of measured values that the evaluation and control unit 5 could have determined from the actual signal of the detector unit 7. In FIG. 3d it is assumed that the Wheel 15 with the detector unit 7 was mounted in each case in the same absolute angular position as was also the case when the stored signature profile (S) was registered.

The vertical shift between the actually registered profiles is substantially due to the fact that the detector unit 7 or its transmitter unit 7a has transmitted in each case with different transmission power. As the stored signature profile and the profiles that are actually registered from the signature signal depend predominantly on properties of the vehicle in terms of their form, it is possible to determine the signature profile for a specific vehicle type only once. This applies at least if the transmission power of the detector devices 7, 9, 11, 13 lies within relatively tight limits. In such a case, it is not necessary to determine the stored signature profile again after the replacement of a wheel, and, thus, a replacement of the detector device.

In the profiles illustrated in FIG. 3, the detector devices could be assigned to the wheel positions such that at a plurality of points, i.e., for a plurality of different angles α, the sum of the squares of the distances between the stored signature profile and the actually registered profiles is determined. If this value is lower than a predetermined limit, a corresponding assignment can take place. Otherwise, the respective wheel position is excluded.

The assignment can, of course, also be carried out such that a registered profile is compared in the fashion described above with each stored signature profile, and an assignment is made to a particular wheel position that is assigned to that stored signature profile at which the comparison has yielded the smallest value for the sum of the squares of the distances.

In the procedure described above, standardizing the curves can significantly reduce the influence of detector units that transmit with different power levels. For example, both the stored signature profile and the registered profiles can be standardized such that the maximum value is set in each case to the value 1. The sum of the squares of the distances is then virtually exclusively a measure of deviations in the shape of the profiles.

Figure 3C:
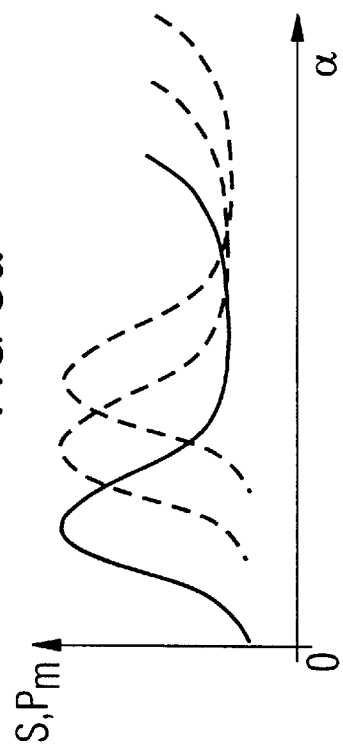
Figure 3D:
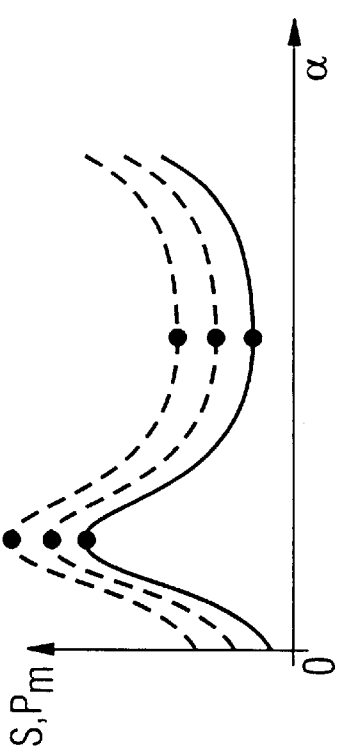

FIG. 3c shows a similar evaluation method, the maximum and minimum values being determined both in the stored signature profile, which in turn corresponds to the profile in FIG. 2a, and in the respectively registered profile. It is then possible in each case to determine the distance of the maximum from the distance from the minimum of respective curves and compare them with one another. Vertical shifts in the registered curves with respect to the stored curve are virtually without influence in such an evaluation. In addition to the comparison of the distances between the maximum and minimum values, the reliability of the evaluation method can be increased by virtue of the fact that the angular spacing between the maximum and minimum values must also correspond within predefined limits. An assignment can be made if the two above-mentioned criteria correspond sufficiently precisely or an exclusion can be made if the required precision of the correspondence is not given.

FIG. 3d shows a further evaluation possibility in which in each case the mean values both of the stored signature profile and of the registered profiles are formed and compared with one another. An assignment is made if the mean value of the stored signature profile corresponds sufficiently precisely to the mean value of a registered signature profile.

We claim:

1. A device for monitoring vehicle wheels, comprising:
   detector units disposed at the wheels, each detector unit having:
   a sensor for registering at least one parameter of a wheel; and
   a transmitter unit transmitting information regarding the at least one parameter, each of said detector units transmitting, with said transmitter unit, the information in a modulated signal over a wireless transmission path;
   a central evaluation and control unit having a receiver unit receiving the information from said transmitter unit and demodulating the signal, said control unit evaluating the information from said detector units, and generating signals dependent thereon;
   said control unit having a normal operating mode and an assignment mode and:
   in said normal operating mode:
      each detector unit transmitting, as the information, an information item relating to the registered parameter and a wheel identifier uniquely defined for each of the wheels; and
      said control unit:
         evaluating the wheel identifier and the information relating to the registered parameter from the signal demodulated by said receiver unit; and
         assigning a wheel position to each information item relating to the registered parameter from the identifier and from a stored assignment information item;
   in said assignment mode:
      each said transmitter unit transmitting, as the information, at least the wheel identifier;
      said receiver unit generating a signature signal representing a measure for an average signal power of the received modulated signal;
      a duration of the signal transmitted by said transmitter unit of said detector units being shorter in comparison with a time required for a complete revolution of a wheel at a maximum speed of the wheel;
      said control unit registering said signature signal derived from each received signal and assigning an angle information item to the respective value of said signature signal;
      said control unit acquiring the angle information item from one of:
         a time interval between one of:
            said signature signals; and
            said signature signals and a fixed time; and
         the group consisting of:

a velocity of the vehicle;
a parameter proportional to the velocity of the vehicle; and
an angle information item relating to an angular position of the respective wheel fed to said control unit; and said control unit assigning to said wheel position said wheel identifier transmitted by each of said detector units by comparing one of registered values and an information item determined therefrom with a stored signature information characteristic of each said wheel position, and storing the angle information item as an assignment information item.

2. The device according to claim 1, wherein the modulated signal is one of a phase-modulated signal and a frequency-modulated signal.

3. The device according to claim 1, wherein said stored signature information is one of:
a characteristic profile formed from values of said signature signal acquired in a predetermined fashion in a reference mode at a plurality of angular positions, a first partial information item being made dependent on a second partial information item; and
at least one characteristic variable of said characteristic profile.

4. The device according to claim 3, wherein said stored signature information is a characteristic profile of said signature signal as a function of one of an angular position and a variable connected thereto.

5. The device according to claim 4, wherein an angular range is one revolution of a wheel.

6. The device according to claim 3, wherein said stored signature information is histogram information, a number of registered values of said signature signal occurring in respectively substantially constant sections of a value range for said signature signal being stored for a predefined number of registered signature signal values.

7. The device according to claim 3, wherein said control unit:
determines at least one characteristic variable of a profile formed from a plurality of signature signal values registered at specific angular positions of a respective one of the wheels; and
compares said at least one characteristic variable with one of corresponding stored characteristic variables and characteristic variables determined from corresponding stored profiles.

8. The device according to claim 3, wherein said at least one characteristic variable is selected from the group consisting of:
a mean value of said signature information;
a standard deviation of values of said profile formed from said signature signal of said signature information;
a maximum difference between values of said profile formed from said signature signal of said signature information; and
said profile of said signature information.

9. The device according to claim 3, wherein said at least one characteristic variable is selected from the group consisting of:
a mean value of said signature information;
a standard deviation of values of said profile formed from said signature signal of said signature information;
a maximum difference between values of said profile formed from said signature signal of said signature information; and
said profile of said signature information.

10. The device according to claim 3, wherein said control unit cross-correlates said profile determined from said signature signal with said stored signature profiles and one of:
excludes wheel positions assigned to ones of said signature profiles at which a correlation coefficient is smaller than a predefined limit; and
assigns wheel positions associated with ones of said signature profiles at which a correlation coefficient is greater than a predefined limit.

11. The device according to claim 1, wherein said control unit automatically switches over into said assignment mode if no revolution of a wheel is detected for a time period longer than a predefined value.

12. The device according to claim 1, including an acceleration sensor, said control unit automatically switching over into said assignment mode if said acceleration sensor detects no revolution of a wheel for a time period longer than a predefined value.

13. The device according to claim 1, wherein said control unit has a reference mode in which:
said control unit acquires said signature information by evaluating and storing said signals transmitted by said detector unit; and
said control unit is informed of an assignment of a signature profile to a respective said wheel position through one of externally supplied signals and externally supplied data inputs.

14. The device according to claim 1, wherein:
said evaluation and control unit is an input, evaluation, and control unit;
said input, evaluation, and control unit has a reference mode in which:
said input, evaluation, and control unit acquires said signature information by evaluating and storing said signals transmitted by said detector unit; and
said input, evaluation, and control unit is informed of an assignment of a signature profile to a respective said wheel position through one of externally supplied signals and externally supplied data inputs.

15. A method of monitoring wheels of a vehicle, which comprises:
providing detector units at the wheels, each detector unit having a sensor and a transmitter unit:
registering at least one parameter of a wheel with a respective sensor;
transmitting information regarding the at least one parameter with the respective transmitter unit in a modulated signal over a wireless transmission path;
receiving the information from the transmitter unit with a receiver unit of a central evaluation and control unit;
demodulating the signal with the receiver unit;
evaluating the information from the detector units with the central evaluation and control unit and generating signals dependent thereon;
in a normal operating mode of the central evaluation and control unit:
each detector unit transmitting, as the information, an information item relating to the registered parameter and a wheel identifier uniquely defined for each of the wheels;
evaluating, with the central evaluation and control unit, the wheel identifier and the information relating to the registered parameter from the signal demodulated by the receiver unit; and assigning, with the central evaluation and control unit, a wheel position to each information item relating to the registered parameter from the identifier and from a stored assignment information item; and in an assignment mode of the central evaluation and control unit:

transmitting, as the information, at least the wheel identifier with each respective transmitter unit, a duration of the transmitted signal being shorter in comparison with a time required for a complete revolution of a wheel at a maximum speed of the wheel;

generating a signature signal representing a measure for an average signal power of the received modulated signal with the receiver unit;

registering the signature signal derived from each received signal with the central evaluation and control unit and assigning an angle information item to the respective value of the signature signal with the central evaluation and control unit;

acquiring the angle information item with the central evaluation and control unit from one of:

a time interval between one of:
the signature signals; and
the signature signals and a fixed time; and the group consisting of:
a velocity of the vehicle;
a parameter proportional to the velocity of the vehicle; and
an angle information item relating to an angular position of the respective wheel fed to the central evaluation and control unit; and the central evaluation and control unit assigning to the wheel position the wheel identifier transmitted by each of the detector units by comparing one of registered values and an information item determined therefrom with a stored signature information characteristic of each the wheel position, and storing the angle information item as an assignment information item.

16. The method according to claim 15, wherein the modulated signal is one of a phase-modulated signal and a frequency-modulated signal.

17. The method according to claim 15, which further comprises automatically switching over into the assignment mode with the control unit if no revolution of a wheel is detected for a time period longer than a predefined value.

18. The device according to claim 15, which further comprises automatically switching over into the assignment mode with the control unit if an acceleration sensor detects no revolution of a wheel for a time period longer than a predefined value.

19. The device according to claim 15, which further comprises, in a reference mode of the control unit:

acquiring the signature information with the control unit by evaluating and storing the signals transmitted by the detector unit; and informing the control unit of an assignment of a signature profile to a respective the wheel position through one of externally supplied signals and externally supplied data inputs.

20. The device according to claim 15, wherein the evaluation and control unit is an input, evaluation, and control unit, and which further comprises, in a reference mode of the input, evaluation, and control unit:

acquiring the signature information with the input, evaluation, and control unit by evaluating and storing the signals transmitted by the detector unit; and informing the input, evaluation, and control unit of an assignment of a signature profile to a respective the wheel position through one of externally supplied signals and externally supplied data inputs.

* * * * *